US008209280B2

(12) United States Patent
Kearney et al.

(10) Patent No.: US 8,209,280 B2
(45) Date of Patent: Jun. 26, 2012

(54) EXPOSING MULTIDIMENSIONAL CALCULATIONS THROUGH A RELATIONAL DATABASE SERVER

(75) Inventors: Christopher Kearney, Chelmsford, MA (US); James Carey, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 679 days.

(21) Appl. No.: 10/899,529

(22) Filed: Jul. 26, 2004

(65) Prior Publication Data

US 2005/0004904 A1   Jan. 6, 2005

Related U.S. Application Data

(63) Continuation-in-part of application No. 10/841,941, filed on May 6, 2004.

(60) Provisional application No. 60/469,032, filed on May 7, 2003.

(51) Int. Cl.
*G06F 17/30* (2006.01)
(52) U.S. Cl. ............... 707/600; 707/758; 707/774
(58) Field of Classification Search ............... 707/3, 101
See application file for complete search history.

(56) References Cited

U.S. PATENT DOCUMENTS

| 5,799,300 | A | 8/1998 | Agrawal et al. |
| 5,905,985 | A | 5/1999 | Malloy et al. ............... 707/100 |
| 5,918,232 | A | 6/1999 | Pouschine et al. |
| 5,926,818 | A | 7/1999 | Malloy ........................ 707/100 |
| 5,937,408 | A | 8/1999 | Shoup et al. |
| 5,940,818 | A | 8/1999 | Malloy et al. ................... 707/2 |
| 5,943,668 | A | 8/1999 | Malloy et al. |
| 5,943,677 | A | 8/1999 | Hicks |
| 5,978,796 | A | 11/1999 | Malloy et al. ................... 707/3 |
| 5,987,452 | A | * 11/1999 | Kung ............................. 707/4 |
| 6,014,614 | A | 1/2000 | Herring et al. |
| 6,108,657 | A | 8/2000 | Shoup et al. |
| 6,122,636 | A | 9/2000 | Malloy et al. ............... 707/102 |

(Continued)

FOREIGN PATENT DOCUMENTS

WO   WO 03/012698   * 8/2001

OTHER PUBLICATIONS

Analysis Services Programming (SQL Server 2000), Passing Queries from SQL Server to a Linked Analysis Server, Microsoft MSDN, Mar. 31, 2002.*

(Continued)

*Primary Examiner* — Christyann Pulliam
(74) *Attorney, Agent, or Firm* — Hickman Palermo Truong Becker Bingham Wong LLP (57) ABSTRACT

Accessing results of calculations on multidimensional data using relational database statements, such as SQL commands, involves a relational database server communicating with a multidimensional database server to cause the multidimensional database server to extract, and to perform calculations on, the multidimensional data. In response to a relational database statement in a language supported by the relational server, which includes an expression of an operation on the multidimensional data in a language supported by the multidimensional server, the multidimensional server extracts the required multidimensional data, performs the requested operation (e.g., an OLAP DML operation) on the data according to the specified expression, and provides results of the multidimensional operation to the relational database server. In one embodiment, the relational server passes information to the multidimensional server that uniquely identifies the location of the particular multidimensional data in the n-dimensional objects.

14 Claims, 4 Drawing Sheets

U.S. PATENT DOCUMENTS

| | | | |
|---|---|---|---|
| 6,163,774 | A | 12/2000 | Lore et al. |
| 6,205,447 | B1 | 3/2001 | Malloy ........................ 707/102 |
| 6,385,301 | B1 * | 5/2002 | Nolting et al. ............. 379/32.01 |
| 6,385,604 | B1 * | 5/2002 | Bakalash et al. ................. 707/3 |
| 6,421,665 | B1 | 7/2002 | Brye et al. |
| 6,480,848 | B1 * | 11/2002 | DeKimpe et al. ................ 707/8 |
| 6,484,179 | B1 | 11/2002 | Roccaforte |
| 6,553,366 | B1 | 4/2003 | Miller et al. |
| 6,601,062 | B1 * | 7/2003 | Deshpande et al. .............. 707/3 |
| 6,629,102 | B1 | 9/2003 | Malloy et al. |
| 6,665,682 | B1 | 12/2003 | DeKimpe et al. |
| 6,701,311 | B2 | 3/2004 | Biebesheimer et al. |
| 6,721,760 | B1 | 4/2004 | Ono et al. .................. 707/104.1 |
| 6,768,986 | B2 * | 7/2004 | Cras et al. ........................ 707/2 |
| 6,826,556 | B1 | 11/2004 | Miller et al. |
| 6,931,418 | B1 | 8/2005 | Barnes |
| 7,181,440 | B2 * | 2/2007 | Cras et al. ........................ 707/2 |
| 7,222,130 | B1 | 5/2007 | Cras et al. |
| 7,805,433 | B2 * | 9/2010 | Dickerman et al. .......... 707/713 |
| 2002/0091707 | A1 | 7/2002 | Keller |
| 2002/0126545 | A1 | 9/2002 | Warren et al. |
| 2003/0084053 | A1 | 5/2003 | Govrin et al. |
| 2003/0208506 | A1 * | 11/2003 | Greenfield et al. ........... 707/102 |
| 2004/0215626 | A1 | 10/2004 | Colossi et al. ................ 707/100 |
| 2004/0236767 | A1 | 11/2004 | Soylemez et al. |
| 2005/0033741 | A1 | 2/2005 | Dombroski et al. .............. 707/3 |

OTHER PUBLICATIONS

HOWTO:SQL Server 7 Distributed Query with OLAP Server, 2000 (available at http://86.83.48.191/Shared%20Documents/sql/olap/distrqry.htm).*

Theodore Johnson and Damianos Chatziantoniou, Extending Complex Ad-hoc OLAP, CIKM 99, ACM, 1999, pp. 170-179.*

Oracle Corporation, "Advanced Analytic Services," 1996-2001, Oracle9i Warehousing Guide, Release 1 (9.0.1), Part No. A90237-01, http://download-west.oracle.com/docs/cd/A91202_01/901_doc/server.901/a90237, data retrieved Aug. 6, 2004, pp. 1-5.

Oracle Corporation, "Transforming Tables into Multidimensional Data Structures," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Understanding the OLAP API," 1996-2001, Oracle9i OLAP Services Concepts and Administration Guide, Release 1 (9.0.1), Part No. A88755-01, http://download-west.oracle.com/docs/cd/A91202_01/901_doc/olap.901/a88755/, data retrieved Aug. 6, 2004, pp. 1-3.

Oracle Corporation, "Controlling the Flow of Execution," 1996-2001, Oracle9i OLAP Services Developer's Guide to the OLAP DML, Release 1 (9.0.1), Part No. A86720-01, http://download-west.oracle.com/docs/cd/A91202_01/901_doc/olap.901/a86720/, data retrieved Aug. 6, 2004, pp. 1-4.

U.S. Appl. No. 10/841,941, filed May 6, 2004.

U.S. Appl. No. 10/944,169, filed Sep. 16, 2004.

"How to:SQL Server 7 Distributed Query with OLAP Server" Jul. 2000 (available at http://86.83.48.191/Shared%20Documents/sql/olap/distrqry.htm) (last accessed Sep. 22, 2011).

* cited by examiner

EXPOSING MULTIDIMENSIONAL CALCULATIONS THROUGH A RELATIONAL DATABASE SERVER

CROSS REFERENCE TO RELATED APPLICATIONS

This application is a continuation-in-part of U.S. patent application Ser. No. 10/841,941 entitled "Efficient SQL Access To Multidimensional Data", filed May 6, 2004, which claims the benefit of priority under 35 U.S.C. §119(e) from U.S. Provisional Application Ser. No. 60/469,032 entitled "Techniques for Managing Multidimensional Data in a Relational Database Management System (RDBMS)", filed May 7, 2003, the disclosures of both of which are incorporated by this reference in their entirety for all purposes as if fully set forth herein.

FIELD OF THE INVENTION

The present invention relates generally to database systems and, more specifically, to techniques for exposing multidimensional calculations through SQL (Structured Query Language).

BACKGROUND OF THE INVENTION

In the context of database systems, a "dimension" is a list of values that provide categories for data. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as "multidimensional data".

Any item of data within a multidimensional variable can be uniquely and completely selected by specifying one member from each of the variable's dimensions. For example, if a sales measure is dimensioned by MONTH, PRODUCT, and MARKET, specifying "January" for the MONTH dimension, "Stereos" for the PRODUCT dimension, and "Eastern Region" for the MARKET dimension uniquely specifies a single value of a measure. A multidimensional variable can be conceptually thought of as an N-dimensional array, where N is the number of dimensions of the variable, and where each value in the array may be accessed by specifying one dimension key value for each dimension (e.g. MDVar(dim1, dim2, dim3, . . . , dimN)). Thus, dimensions offer a concise and intuitive way of organizing and selecting data for retrieval, updating, and performing calculations.

Multidimensional arrays with 2 and 3 dimensions may be depicted visually as grids and cubes, respectively. For convenience, it has become customary to refer to the conceptual multidimensional arrays that correspond to multidimensional variables as "multidimensional cubes" (or simply "cubes") regardless of how many dimensions they possess. Hence, a multidimensional data cube is a set of n-dimensional data objects. Further, each multidimensional value is said to belong to a "cell" of the cube, where the address of the cell is the set of dimension key values (one per dimension) that correspond to the multidimensional value contained therein.

For the purpose of explanation, the multidimensional value that belongs to a cell shall be referred to as the "cell value" of that cell. Cell values may include base measure values, where a measure is a type of data (e.g., sales), or aggregated measure values, such as a summation, average, minimum value, maximum value, and the like. For example, a cell might contain a value representing a summation of sales in dollars for a particular product in a particular time period in a particular market, where "sales" is the measure and summation is the aggregation function.

Multidimensional data may be stored in relational database management systems ("RDBMS") or in specialized, "multidimensional" database management systems ("MDDBMS"). MDDBMSs provide structures and access techniques specifically designed for multidimensional data, and therefore provide relatively efficient storage and access to multidimensional data. However, when stored in specialized MDDBMSs, only applications that are specially built to interact with those systems are able to access and manipulate the data. This is because the commands sent to the MDDBMSs have to conform to the command language supported by the MDDBMS.

Typically, multidimensional data is associated with Online Analytical Processing (OLAP), which allows users to analyze different dimensions of multidimensional data. Often, OLAP is used for data warehousing and, at times, data mining. The command languages of MDDBMSs with OLAP capabilities typically provide native support for specifying and executing many different OLAP DML operations, i.e., functions or operations that can be used to manipulate multidimensional data.

When multidimensional data is stored in RDBMSs, all applications that support interaction with relational databases have access to the data. Such database applications communicate with the RDBMS by submitting commands that conform to the database language supported by the RDBMS, the most common of which is the ANSI Structured Query Language (SQL). However, the RDBMSs and SQL do not have native support for many of the OLAP DML operations.

According to one approach, multidimensional data may be stored in a MDDBMS, but accessed by sending SQL to a RDBMS. In this approach, the RDBMS interacts with the MDDBMS to access the data from the MDDBMS. Unfortunately, because the operations are initially specified in SQL to the RDBMS, the native capabilities of the MDDBMS to perform OLAP operations are underutilized.

Based on the foregoing, there is room for improvement in techniques for invoking OLAP operations on multidimensional data through a RDBMS. Specifically, there is room for improvement in techniques for accessing results of calculations involving multidimensional data using the SQL.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring embodiments of the present invention.

Functional Overview of Embodiments

Techniques are described for accessing calculations on multidimensional data using relational database statements, such as SQL commands. The multidimensional data is stored according to a multidimensional schema that is accessible to a multidimensional database server. To access the multidimensional data, a relational database statement is submitted to a relational database server. To completely process the relational database statement, the relational database server communicates OLAP DML commands to the multidimensional database server to cause the multidimensional database server to extract, and to perform calculations on, the multidimensional data required by the relational database server. The multidimensional database server extracts the required multidimensional data, performs the requested calculations on the multidimensional data according to a specified operation (e.g., an OLAP operation), and provides results of the multidimensional calculations to the relational database server.

For example, a SQL statement is received by a SQL engine of a RDBMS, and the SQL engine recognizes an OLAP_EXPRESSION function that specifies an OLAP operation on some multidimensional data stored in the relational database according to a multidimensional schema. The relational database server then sends an OLAP command, supported by the native language of a multidimensional database server, to the multidimensional database server. This command includes information that uniquely identifies the location of the particular multidimensional data in the n-dimensional objects, and that expresses the operation in a language or format that is supported by the multidimensional server but not the relational server. In turn, the multidimensional database server executes the specified operation on the particular data, and returns to the relational server a set of values resulting from execution of the operation (i.e., a result set).

According to one embodiment of the invention, the relational server accesses, from a result set, the information that uniquely identifies the location of the data on which the operation operates. The result set was previously created by the multidimensional server in response to a table function that is included in the database statement received at the relational server, to enable the relational database server to access and manipulate data from the result set as if the data resided in a relational table.

The information that uniquely identifies the location of the data on which the operation operates effectively functions as an indexing mechanism into the multidimensional data domain. This identifying information is fetched from a column of the result set and passed to the multidimensional database server. In one embodiment, the information that uniquely identifies the data is a mapping to one or more particular data structures that were previously generated in response to the database statement and which provide the location of data, within the multidimensional data domain (i.e., within the n-dimensional data objects), that is associated with a row of the result set.

Using the described technique, a database user can request, via a relational server, performance of multidimensional data operations (e.g., OLAP data manipulation operations) on multidimensional data stored in a relational database according to multidimensional schema. In other words, the ability to explicitly specify multidimensional calculations is provided to users that access multidimensional data using a relational database language, such as SQL. Furthermore, if relational views are used to encapsulate multidimensional data operation descriptions, SQL-based applications that do not understand the OLAP DML-specific clauses can still be effectively used to run standard SQL statements against these views.

The techniques described herein may be used in embodiments where the multidimensional data and schema managed by the multidimensional database server resides separate from relational data and schema managed by the relational database server. Alternatively, the multidimensional data may itself be stored within relational database structures managed by the relational database server. For example, the data may be stored persistently in relational database tables, as BLOBs (Binary Large Objects).

These techniques can be employed to extract and manipulate, via OLAP DML operations, multidimensional data stored in a relational database for presentation to a relational database server, e.g., a SQL processing engine. The relational database server may perform further query and manipulation operations on the result data set returned by the multidimensional database server, based on conventional relational SQL statements and/or relational DML operations.

Operating Environment

Figure 1:
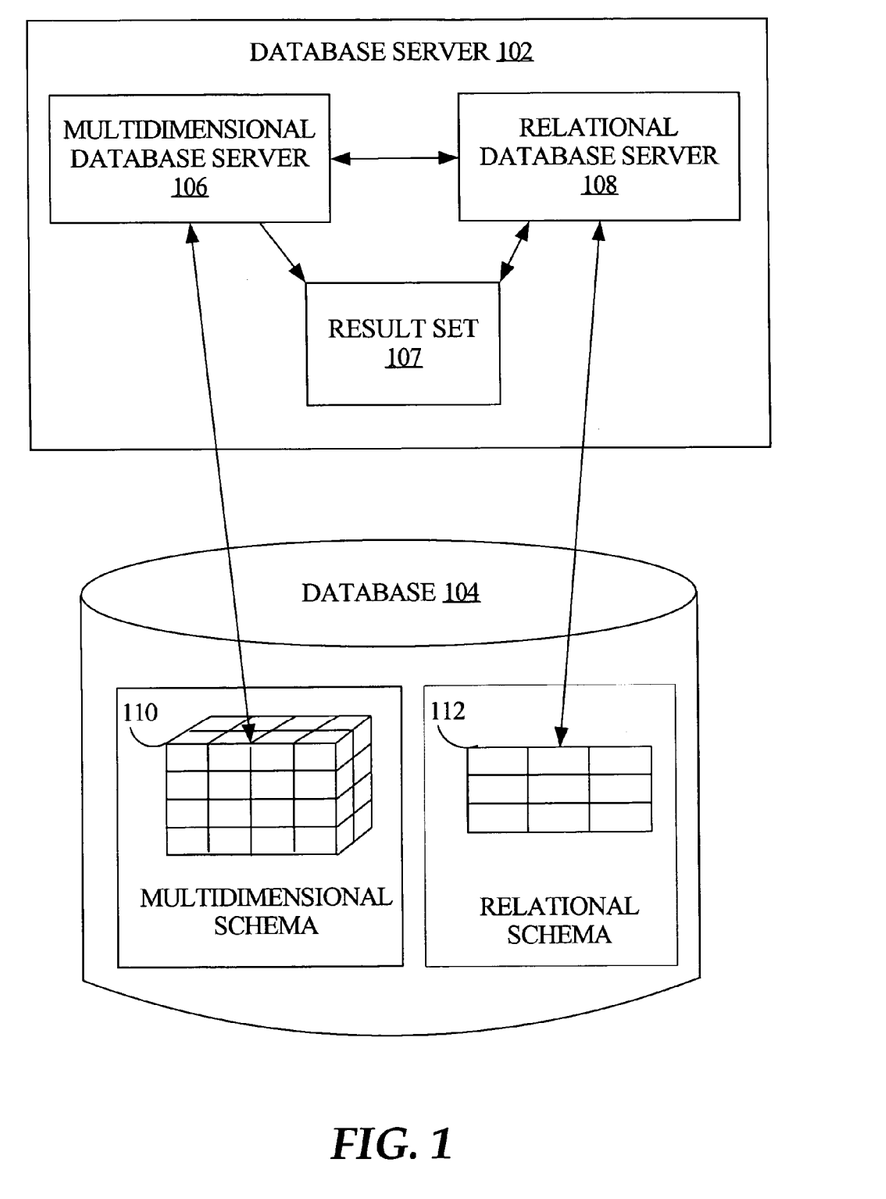
FIG. 1 is a block diagram that illustrates an operating environment in which an embodiment of the invention may be implemented.

FIG. 1 is a block diagram that illustrates an operating environment in which an embodiment of the invention may be implemented.

The operating environment includes a database server 102 and a database 104. Database server ("server") 102 comprises a combination of integrated software components and an allocation of computational resources (such as memory and processes) for executing the integrated software components on one or more processors, where the combination of the software and computational resources are used to manage a particular database on behalf of clients of the server. Among other functions of database management, a database server 102 governs and facilitates access to a particular database, such as database 104, by processing requests by clients to access the database.

Database server 102 comprises a multidimensional database server 106, which is a server module that is specially built to interact with multidimensional data in a multidimensional schema, such as multidimensional data represented as cube 110. Multidimensional database server 106 is able to interpret the multidimensional data, which, in one embodiment, is stored as one or more LOBs or BLOBs in a relational database table. Based on techniques described herein, multidimensional database server 106 manages extraction of, and calculations upon, multidimensional data from database 104, for presentation to relational database server 108.

Database server 102 comprises a relational database server 108, which is a server module that parses, interprets and manages execution of database statements on database 104. In one embodiment, relational database server 108 comprises a SQL processor that parses, interprets and manages execution of data queries and/or operations embodied in SQL statements. During processing of a database statement, relational database server 108 can request multidimensional data (e.g., from cube 110) and receive a return set of multidimensional data, such as data logically structured in a result set 107, from multidimensional database server 106. Relational database server 108 can further process the return set according to one or more SQL statements, either during the same session with database 104 or during another session with database 104 if the result set is persistently stored in the database. Relational database server 108 can directly access and operate on data in one or more relational table 112, and can access and operate on data stored in one or more multidimensional cube 110 via multidimensional database server 106.

Database 104 is communicatively coupled to server 102 and is a repository for storing data and metadata on a persistent memory mechanism, such as a set of hard disks. Such data and metadata may be stored in database 104 logically, for example, according to relational schema, multidimensional schema, or a combination of relational and multidimensional schema. Database 104 comprises a multidimensional schema for one or more multidimensional cubes 110, which is an abstract data construct that represents multidimensional data.

Database 104 comprises a relational schema for storing relational database tables such as table 112. Table 112 may store, for example, relationally managed base data as well as pre-computed aggregated data. In one embodiment, database 104 stores both multidimensional cubes 110 and relational tables 112. Hence, in such an embodiment, database 104 and database server 102 are part of a relational database management system (RDBMS) that is capable of storing, managing and manipulating relational and multidimensional data and that provides structures and access techniques designed for multidimensional data and structures and access techniques designed for relational data.

However, embodiments are not limited to an operating environment in which both the multidimensional schema and the relational schema are integrated into a common database 104, as depicted in FIG. 1. Rather, in one embodiment, the multidimensional schema and the relational schema are associated with separate databases that are both ultimately accessible via relational database server 102. In addition, embodiments are not limited to an operating environment in which both the multidimensional database server 106 module and the relational database server 108 module are integrated into a common database server 102, as depicted in FIG. 1. Rather, in one embodiment, the multidimensional database server 106 and the relational database server 108 are separate servers that are communicatively coupled to each other.

Providing Calculations on Multidimensional Data Through a Relational Database Management System Multidimensional Schema SQL-based applications can request multidimensional data from n-dimensional data objects. In an object-relational database system, two mechanisms in the database's construction assist in facilitating such requests: object types and table functions.

An object type encapsulates a data structure along with the functions and procedures needed to manipulate the data contained therein. The individual elements of the data structure are referred to as properties. With multidimensional data, the "real-world objects" that correspond to the properties of an object type are measures, dimensions, hierarchies, attributes, and the like. By defining object types for groupings of objects, and then defining result sets of these objects, the format of multidimensional data is described as rows and columns to a relational database server 108 (FIG. 1), e.g., to a SQL processor of a relational database server.

One way to request multidimensional data, from n-dimensional data objects, that is stored according to a multidimensional schema is to use a table function. Table functions produce a collection of rows that can be queried like a database table. For example, a table function is used instead of a database table name in the FROM clause of a SQL query. Table functions can be used to fetch data from objects in a multidimensional data workspace. If table functions are used in conjunction with relational views, the multidimensional source of the data is transparent to SQL-based applications, which can then use standard SQL statements to run against the views of the multidimensional data just as applications access other relational tables and views in the relational schema.

One approach to providing management of multidimensional data using a table function is described in U.S. patent application Ser. No. 10/841,941 entitled "Efficient SQL Access To Multidimensional Data", the content of which is incorporated by reference in its entirety for all purposes as if fully set forth herein. A particular table function that may be used to implement embodiments described in the reference is referred to therein as the OLAP_TABLE function.

Although embodiments of the present invention are not limited to use with the OLAP_TABLE function but may be implemented in conjunction with other similarly operating functions, embodiments described herein utilize a mapping that, in one embodiment, is generated by execution of the OLAP_TABLE function. However, embodiments described herein are not limited to use of a mapping generated by the particular OLAP_TABLE function because the mapping may be generated in other ways. For purposes of discussion herein, the mapping that is used is described in relation to a general function that operates to extract and present, to a relational database server, particular multidimensional data from n-dimensional data objects, in response to a relational database statement.

Figure 2A:
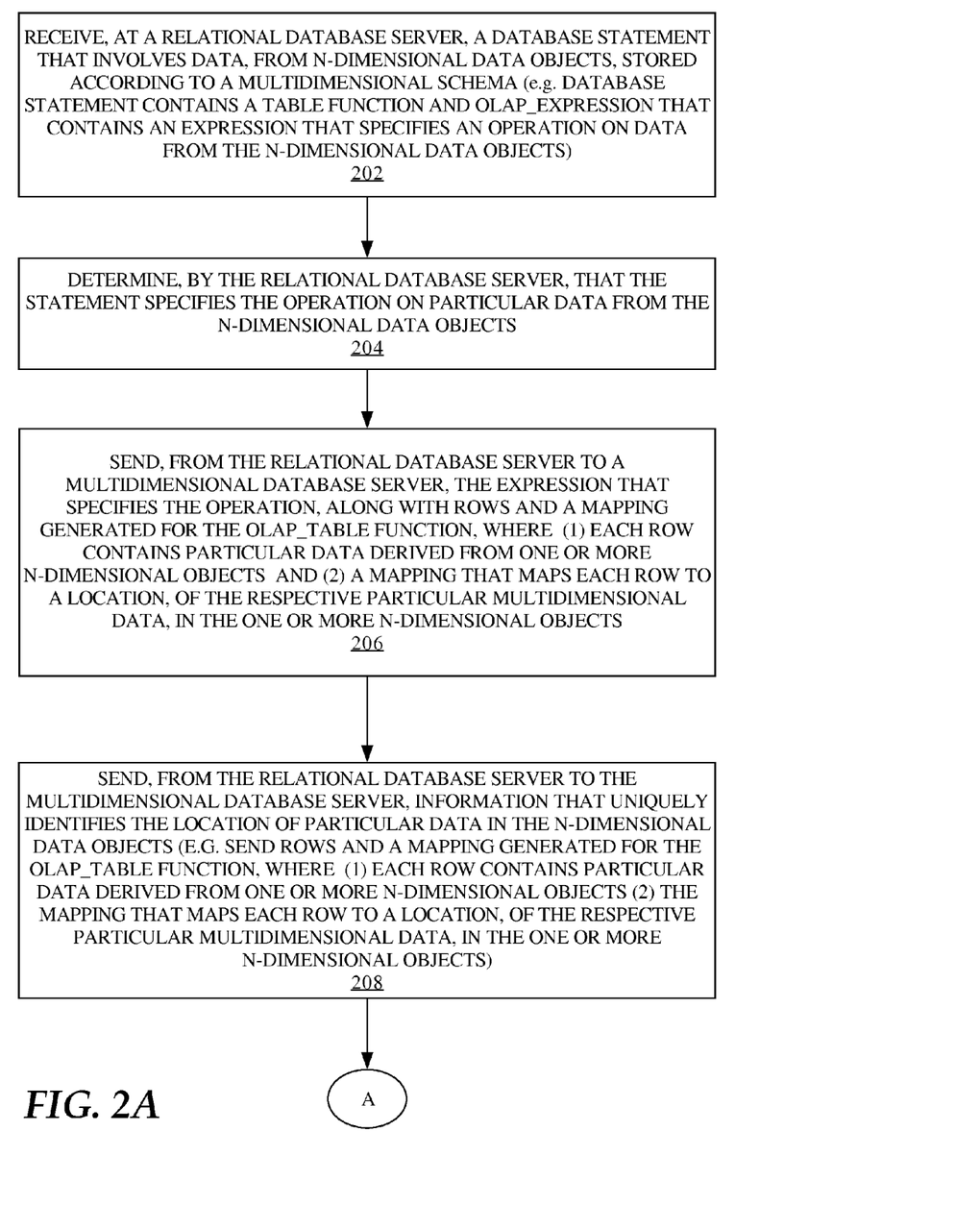
FIGS. 2A and 2B depict a flow diagram that illustrates a method for providing multidimensional data calculations through a relational database management system, according to an embodiment of the invention.
Figure 2B:
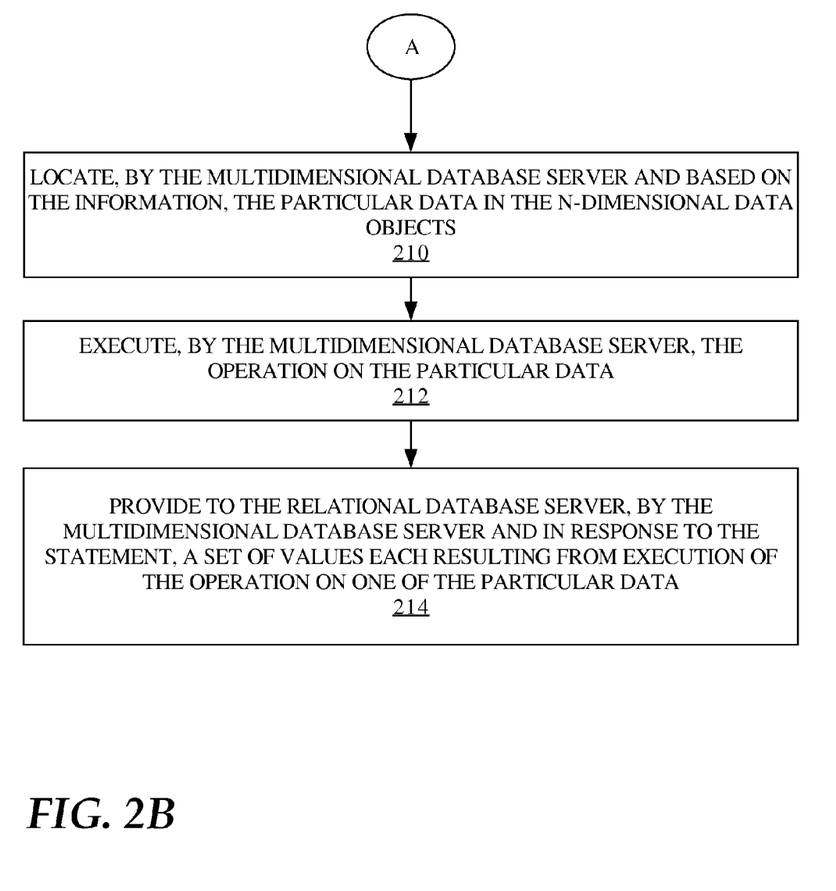

FIGS. 2A and 2B depict a flow diagram that illustrates a method for providing multidimensional data calculations through a relational database management system, according to an embodiment of the invention. Performance of each and every block of FIGS. 2A and 2B is not required in all embodiments of the invention; however blocks 202-212 are all depicted in FIGS. 2A and 2B for reference and explanation purposes.

At block 202, a relational database statement is received, which involves data from n-dimensional data objects stored according to a multidimensional schema. For example, a SQL engine of a relational database server of a RDBMS, such as relational database server 104 (FIG. 1), receives a SQL statement that involves multidimensional data.

At block 204, the relational database server determines that the statement specifies an operation on particular data from the n-dimensional data objects. For example, the SQL engine of the relational database server 108 (FIG. 1) recognizes a function that specifies an OLAP operation or calculation on some multidimensional data, such as cube 110 (FIG. 1), stored according to a multidimensional schema in n-dimensional data objects in database 104 (FIG. 1).

In one implementation, the function that specifies the OLAP operation is referred to as the OLAP_EXPRESSION function. Thus, in this description, in reference to a function that operates as described hereafter, such function will be referred to as the OLAP_EXPRESSION function. However, embodiments of the invention are not limited to use of the particular function referred to as OLAP_EXPRESSION function in the referenced implementation.

OLAP_EXPRESSION Function

The OLAP_EXPRESSION function, and any similarly functioning function, allows for execution of OLAP-type DML operations (also referred to as "expressions") in the multidimensional data domain. Hence, custom measures can be generated using the OLAP_EXPRESSION function in a SELECT clause of a relational database statement. Furthermore, in addition to generating custom measures, the OLA- P_EXPRESSION function can be used in WHERE and ORDER BY clauses to modify the result set of the SELECT clause.

A function used for providing results of an operation (e.g., calculations) on multidimensional data to a relational database server, such as the OLAP_EXPRESSION function, includes at least two input parameters: (1) identification of a column of a table [e.g., a "row-to-cell" column of the result set 107 (FIG. 1)], in which information that uniquely identifies the location of particular multidimensional data that is associated with a row is logically stored, where the information is effectively a mapping of the row to the storage location of the particular multidimensional data within the multidimensional data domain, i.e., the n-dimensional data objects; and (2) a representation (i.e., an expression) of the operation that is to be performed on the particular multidimensional data. In effect, the information that uniquely identifies the location of particular multidimensional data that is associated with a row sets up the context for evaluation of the specified operation on data associated with that row.

As mentioned, one way to generate the mapping is by executing a function (e.g., the OLAP_TABLE function) that operates to extract and present, to a relational database server, particular multidimensional data from n-dimensional data objects. In one embodiment, as part of the extraction and presentation process, the function may, if specified, build one or more data structures that are used to map rows of a relational table or view to n-dimensional data objects from which the rows were derived, and populate the row-to-cell column of the result set with a representation of the mapping for each row. Therefore, these mappings are available for execution of the OLAP_EXPRESSION function, which uses the representation of the mapping for each row to traverse through the appropriate data structures to arrive at the particular n-dimensional data object(s) that are associated with data in the row.

With a multidimensional data structure in which each cell contains a single measure value that is associated with a particular combination of dimension keys [e.g., (time1, geography1, product1, sales) identifies one cell; (time1, geography1, product1, units) identifies another cell], a unique row-to-cell mapping represents the location of data that is associated with the cross-product of (time1, geography1, product1), at which values for multiple measures may be accessed and/or calculated. In one embodiment, a dimension (e.g., time) of a multidimensional cube may be structured in "embedded total" form, in which multiple levels of a hierarchy are represented in the dimensional structure (e.g., day, month, quarter, year). Hence, a row-to-cell mapping may represent the location of data that already is, or can be, aggregated at a certain level of a dimensional hierarchy (e.g., data aggregated for a month, quarter or year).

At block 206, the relational database server sends to the multidimensional database server an expression that specifies the operation. The expression conforms to a language or format that is supported by the multidimensional server but not the relational server. For example, the relational server 106 (FIG. 1) sends the expression from an OLAP_EXPRESSION or similar function to the multidimensional server 108 (FIG. 1). The expression specifies an operation (e.g., an OLAP DML operation) on particular multidimensional data, such as from cube 110 (FIG. 1), which is stored according to a multidimensional schema. The relational server does not need to "understand" (i.e., support) the expression because the expression is passed to the multidimensional server for processing. This is because the relational server does not understand the structure of the multidimensional schema, only the multidimensional server does. Furthermore, the relational server does not support the command language of multidimensional database systems and, therefore, cannot execute such commands (e.g., OLAP DML commands).

At block 208, the relational database server sends to the multidimensional database server the information that uniquely identifies the location of the particular data in the n-dimensional objects. For example, the relational server 106 (FIG. 1) passes the representations of the mappings from the row-to-cell column of the result set 107 (FIG. 1) to the multidimensional server 108 (FIG. 1).

At block 210, the multidimensional server locates the particular data in the n-dimensional data objects based on the information that uniquely identifies the location of the particular data in the n-dimensional objects. For example, the multidimensional server 108 uses the representations of the mappings from the row-to-cell column of the result set 107 to traverse through the data structures to arrive at the location of the particular data on which the specified operation is to be executed. The particular data in the n-dimensional objects may be, for example, data that is pre-aggregated along one or more levels of a dimensional hierarchy, and/or may be base (i.e., unaggregated) data, which can be aggregated "on-the-fly" if necessary to respond to the database statement.

The location of the particular data is at times referred to as a "dimensional offset" value, or simply the "offset", for a cell, of the multidimensional data domain, in which the particular data is stored. The offset commonly represents a composition of key values from each dimension associated with a given cell, which ultimately maps to a location in memory at which data is stored, such as one or more measure values with which the specified operation is to be evaluated. The manner in which the mappings, and the representations of the mappings, are implemented is not critical and, therefore, may vary from implementation to implementation.

However, in one embodiment, the representation of the row-to-cell mapping comprises (1) information for specifying a "handle" that identifies a data structure that was generated for the particular query for the particular database session in which the mapping was generated, and (2) information for specifying the row of the result set that was derived from values in one or more n-dimensional data objects, which can be used to look up in the data structure the location (e.g., offset) of the dimensional coordinates of particular cell(s) with which the particular data is associated and, ultimately, the location of the particular data in memory.

At block 212, the multidimensional database server executes the operation on the particular data in the multidimensional data domain. The specified operation, such as an OLAP DML operation, can include any valid manipulation of multidimensional data that returns a value. OLAP DML is a data manipulation language for performing complex analysis of multidimensional data in the multidimensional data domain. OLAP DML commands are not understood by, and therefore not directly supported by, the relational server. Non-limiting examples of such operations on multidimensional data include aggregation, allocation, date and time operations, financial operations, forecasts and regressions, modeling, statistical operations, time series manipulations, numeric calculations, use of the data as variable values in formulas and functions, and the like. Operations may be user-defined, thereby providing support for calculation of ad-hoc custom measure values.

In one embodiment, the data on which the operation is evaluated is not stored in the result set, but is associated with a row of the result set. In other words, a given row of the result set includes one or more values associated with the given dimensional coordinates to which the row maps, but does not include the particular data on which the operation is executed. For example, a row of the result set may include (a) a value for "number of units sold" that is associated with a cell that is identified by key values (time1, geography1, product1) of dimensions time, geography, and product; where (b) the operation specifies calculation of the difference between values for "sales" and "cost" that are associated with the cell that is identified by key values (time1, geography1, product1), to return "profit" associated with the cell, but where (c) "sales" and "cost" are not specified by the database statement (e.g., in the OLAP_TABLE function) to be included in the result set.

At block 214, the multidimensional server provides to the relational server results of the operation on the particular data. In one embodiment, a new result set is provided that includes a value associated with each row of the result set 107, where each value results from execution of the operation on data associated with the row. The data is associated with the row because the data is associated with the dimensional coordinates (i.e., key values) from which the row was derived. However, as discussed, the data operated upon is not necessarily in the result set 107. Furthermore, in one embodiment, the results of the operation are not returned and presented to the relational server in the result set 107, but are returned in a typical relational server row source format.

In one embodiment, there is one OLAP_EXPRESSION function for each respective data type: (1) OLAP_EXPRESSION; (2) OLAP_EXPRESSION_TEXT; (3) OLAP_EXPRESSION_BOOL; and (4) OLAP_EXPRESSION_DATE. Each function type operates similarly, with the difference between function types being the return data type. That is, OLAP_EXPRESSION returns a number data type; OLAP_EXPRESSION_TEXT returns a varchar2 (variable character, i.e., text) data type; OLAP_EXPRESSION_BOOL returns a Boolean data type which, in this embodiment, is a "0" or "1"; and OLAP_EXPRESSION_DATE returns a date data type.

Hardware Overview

Figure 3:
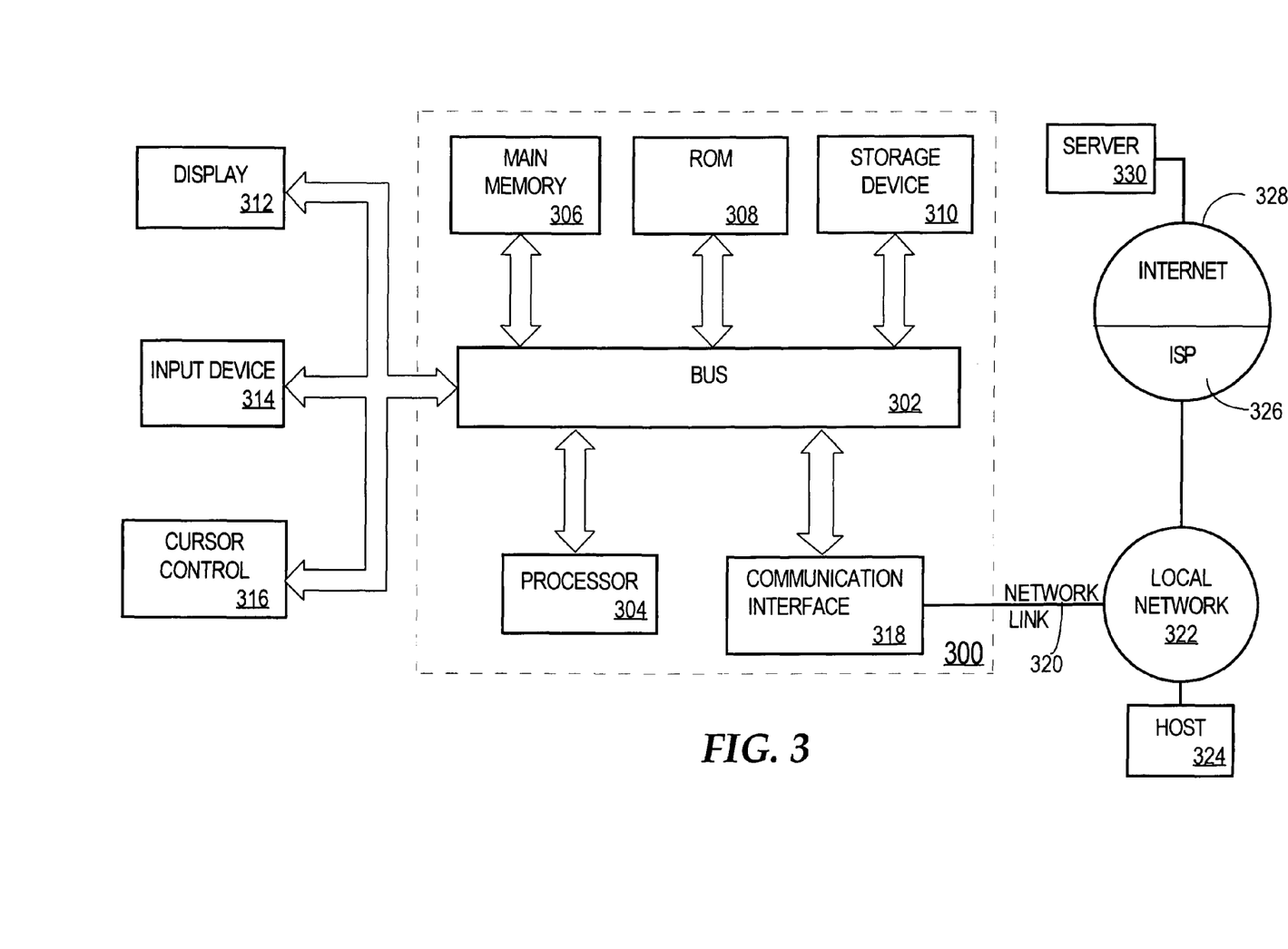
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, optical disk, or magneto-optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical, magnetic, or magneto-optical disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method comprising the computer-implemented steps of:
   a relational database server receiving a relational database statement that specifies a first expression and a second expression, wherein at least a part of said relational database statement is expressed in a first language supported by said relational database server;
   wherein said first expression specifies to extract data from n-dimensional data objects stored in a database according to a multidimensional schema and present said extracted data as rows;
   wherein said second expression includes a multidimensional expression that specifies a multidimensional operation, wherein said multidimensional expression is expressed in a second language supported by a multidimensional database server;
   said relational database server causing said multidimensional database server to compute said first expression, said computation of said first expression returning to said relational database server:
   (1) a set of rows, each row of said set of rows containing particular data derived from one or more n-dimensional objects, and
   (2) a mapping that maps each row of said rows to a location, of the respective particular multidimensional data, in said one or more n-dimensional objects;
   said relational database server causing said multidimensional server to compute second results for said second expression using said set of rows and said mapping resulting from the computation of said first expression as input to the second expression and returning said second results to the relational database server; and
   wherein the method is performed by one or more computing devices.

2. The method of claim 1, wherein said mapping includes data stored in a column of said set of rows.

3. The method of claim 1, further comprising the computer-implemented step of:
   generating, by said multidimensional database server, said particular data derived from one or more n-dimensional objects to include in said mapping.

4. The method of claim 1, wherein said relational database statement conforms to Structured Query Language (SQL).

5. The method of claim 1, wherein said first expression is a first function expression within said relational database statement that specifies a request for multidimensional data from n-dimensional data objects and said second expression is specified within a second function expression within said relational database statement that specifies an OLAP operation.

6. The method of claim 5, wherein said first expression is OLAP_TABLE.

7. The method of claim 5, wherein said second expression is OLAP_EXPRESSION.

8. A non-transitory computer-readable storage medium storing one or more sequences of instructions which, when executed by one or more processors, causes the one or more processors to perform steps of:
   a relational database server receiving a relational database statement that specifies a first expression and a second expression, wherein at least a part of said relational database statement is expressed in a first language supported by said relational database server;
   wherein said first expression specifies to extract data from n-dimensional data objects stored in a database according to a multidimensional schema and present said extracted data as rows;
   wherein said second expression includes a multidimensional expression that specifies a multidimensional operation, wherein said multidimensional expression is expressed in a second language supported by a multidimensional database server;
   said relational database server causing said multidimensional database server to compute said first expression, said computation of said first expression returning to said relational database server:
   (1) a set of rows, each row of said set of rows containing particular data derived from one or more n-dimensional objects, and
   (2) a mapping that maps each row of said rows to a location, of the respective particular multidimensional data, in said one or more n-dimensional objects;
   said relational database server causing said multidimensional server to compute second results for said second expression using said set of rows and said mapping resulting from the computation of said first expression as input to the second expression and returning said second results to the relational database server.

9. The non-transitory computer-readable storage medium of claim 8, wherein said mapping includes data stored in a column of said set of rows.

10. The non-transitory computer-readable storage medium of claim 8, further comprising the computer-implemented step of:
generating, by said multidimensional database server, said particular data derived from one or more n-dimensional objects to include in said mapping.

11. The non-transitory computer-readable storage medium of claim 8, wherein said relational data statement conforms to Structured Query Language (SQL).

12. The non-transitory computer-readable storage medium of claim 8, wherein said first expression is a first function expression within said relational database statement that specifies a request for multidimensional data from n-dimensional data objects and said second expression is specified within a second function expression within said relational database statement that specifies an OLAP operation.

13. The non-transitory computer-readable storage medium of claim 12, wherein said first expression is OLAP_TABLE.

14. The non-transitory computer-readable storage medium of claim 12, wherein said second expression is OLAP_EXPRESSION.

* * * * *

UNITED STATES PATENT AND TRADEMARK OFFICE
CERTIFICATE OF CORRECTION

PATENT NO.      : 8,209,280 B2
APPLICATION NO. : 10/899529
DATED           : June 26, 2012
INVENTOR(S)     : Kearney et al.

Page 1 of 1

It is certified that error appears in the above-identified patent and that said Letters Patent is hereby corrected as shown below:

On Title Page 2, Item (56), under "Other Publications", line 1, delete "HOWTO:SQL" and insert -- HOW TO:SQL --, therefor.

On Title Page 2, in column 2, Item (56), under "Other Publications", line 24, delete "to:SQL" and insert -- To:SQL --, therefor.

Signed and Sealed this
Sixteenth Day of October, 2012

David J. Kappos
*Director of the United States Patent and Trademark Office*